(12) United States Patent
Khire et al.

(10) Patent No.: US 11,675,627 B1
(45) Date of Patent: Jun. 13, 2023

(54) METHOD AND SYSTEM FOR INTEGRATING MULTIPLE CLOUD PLATFORMS WITH DIAGRAMING TOOLS

(71) Applicant: BEREEJ TECHNOLOGIES PRIVATE LIMITED, Maharashtra (IN)

(72) Inventors: Sudeep Mohan Khire, Maharashtra (IN); Sunil Pandurang Vetal, Downers Grove, IL (US)

(73) Assignee: Bereej Technologies Private Limited

( * ) Notice: Subject to any disclaimer, the term of this patent is extended or adjusted under 35 U.S.C. 154(b) by 0 days.

(21) Appl. No.: 17/564,667

(22) Filed: Dec. 29, 2021

(51) Int. Cl.
*G06F 15/173* (2006.01)
*G06F 9/50* (2006.01)
*H04L 41/14* (2022.01)
*H04L 41/12* (2022.01)

(52) U.S. Cl.
CPC .......... *G06F 9/5072* (2013.01); *G06F 9/5088* (2013.01); *H04L 41/12* (2013.01); *H04L 41/145* (2013.01)

(58) Field of Classification Search
CPC ..... G06F 9/5072; G06F 9/5088; H04L 41/12; H04L 41/145
See application file for complete search history.

(56) References Cited

U.S. PATENT DOCUMENTS

| | | | | |
|---|---|---|---|---|
| 2012/0259845 A1* | 10/2012 | Matejka | ............... | G09B 7/02 707/723 |
| 2014/0278808 A1* | 9/2014 | Iyoob | ............... | G06Q 30/0206 705/7.35 |
| 2015/0378702 A1* | 12/2015 | Govindaraju | ............. | G06F 8/60 717/177 |

* cited by examiner

*Primary Examiner* — Wing F Chan
*Assistant Examiner* — Joseph R Maniwang
(74) *Attorney, Agent, or Firm* — Fresh IP PLC; John R. Bednarz

(57) ABSTRACT

The present invention discloses a method for implementation of a software application implemented by a processor of a computer system, wherein said software application enables mapping of one or more diagramming elements to one or more cloud computing server, wherein said method comprising: Configuring, by an application interface, at least a 2D or 3D network architecture model on a first cloud computing platform, using one or more cloud components directly from a graphical drawing tool; deploying, by said application interface, said network architecture model on said first cloud computing platform to create a cloud application network; requesting, by said application interface, a copy of said cloud application network from said first cloud computing platform; shifting, by said application interface, said cloud application network from said first cloud computing platform to said second cloud computing platform for deploying said cloud components in a second cloud computing platform.

9 Claims, 5 Drawing Sheets

METHOD AND SYSTEM FOR INTEGRATING MULTIPLE CLOUD PLATFORMS WITH DIAGRAMING TOOLS

TECHNICAL FIELD OF THE INVENTION

Figure 1:
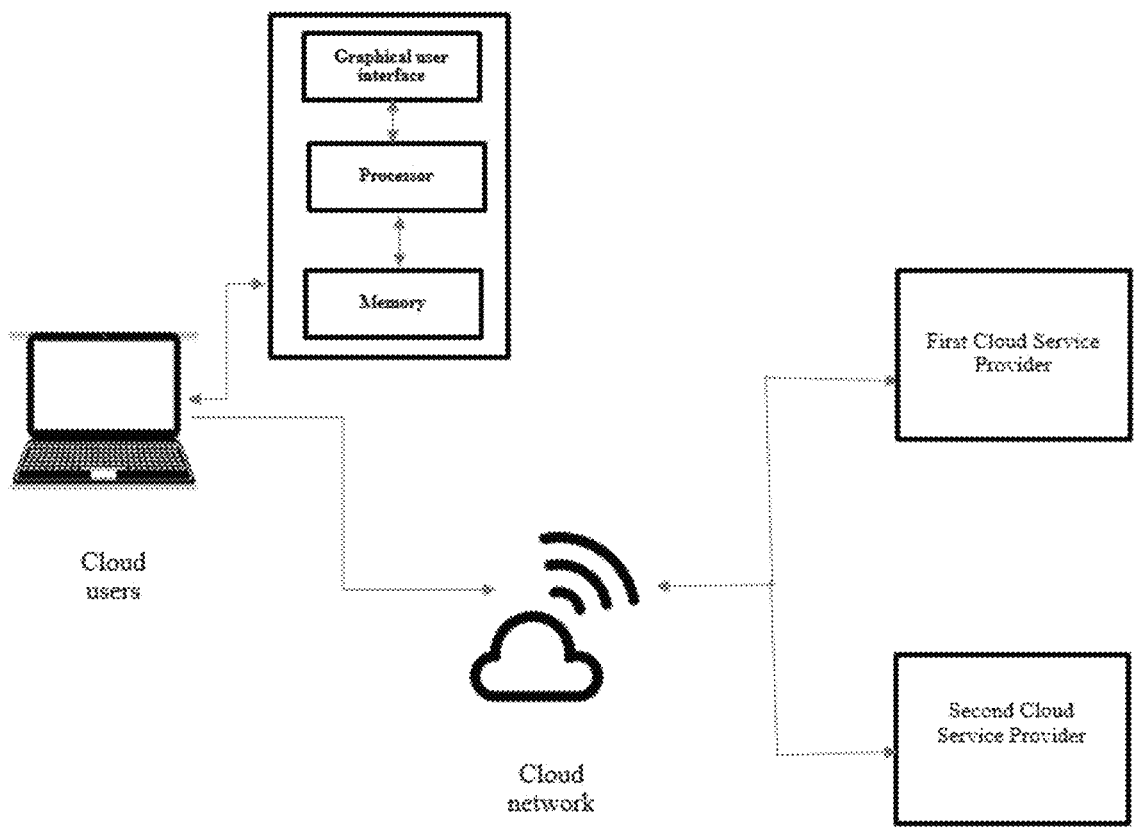

The present invention generally relates to an application interface by means of which a user interacts with one or more cloud computing platforms, and more specifically, the present invention relates to software applications that enables interaction between multiple cloud computing platforms and multiple diagramming tools.

BACKGROUND OF THE INVENTION

The use of cloud computing platforms has rapidly increased in the past several years. The cloud computing platforms, that may include but not limited to Amazon AWS, IBM Cloud, Google Cloud Platform, Microsoft Azure and the like, provide a number of services that allows companies to minimize initial information technology infrastructure expenses and also enable companies to adjust resources to meet unpredictable demand fluctuations.

It is difficult to manage the "inventory" of the cloud components that may include but not limited to virtual machines/servers, databases, serverless components, load balancers and the like or any combinations thereof. Moreover, a user can't get the pictorial view of the landscape on both organization level and application level. For example, if one application uses one load balancer, 4 application servers and one database. Now, it is difficult to distinguish these 4 servers out of 40-50 servers the organizations have.

Further, an enterprise user (cloud service requesters) may utilize more than one cloud computing platform to mitigate the remote chance that a particular cloud computing platform may suffer a failure or an even a catastrophic failure, and all of the enterprises data and or services may be lost. Also, depending upon the geographic locations of a cloud computing platforms, the enterprise may use multiple different cloud computing platform providers to allow for expansion of service when one geographic region experiences greater and perhaps unanticipated usage as compared to a cloud computing platform located thousands of miles away.

Further, at present, when users use cloud computing, it is difficult to use platforms for services provided by different cloud computing providers. For example, when a consumer uses the cloud computing provided by AWS, it is possible to use a platform for the cloud service provided by AWS, and when a user uses the cloud computing provided by Azure, it is possible to use the platform for the cloud service provided by Azure. However, when the consumer needs to use services provided by different providers, as capabilities and interfaces between cloud services are incompatible, a platform for each provider have to be established respectively. On one hand, it is inconvenient for consumers to use different cloud services: on the other hand, the system resources are wasted and the system efficiency is low.

Experience with the cloud computing platforms offered by different providers shows that data may easily be input into a respective cloud computing platform; however, extracting the cloud components and storing it into another provider's cloud computing platform may be challenging. Challenges particularly arise when a user wishes to copy less than all of the data stored on a data storage disk in one could computing platform and transfer the copied data to another provider's cloud computing platform.

There are many existing tool which generates the diagram from the existing cloud components. But it completely lacks from creating the network, replicating it within the cloud service provider and across. Some of the other existing software tool enables an AWS diagram maker to generate a network topology diagram in seconds. It can pull the diagram from cloud provider (e.g. AWS) into their drawing canvas. It can also manage different versions of the diagrams.

Further, there are other existing services which model the real AWS environment by securely connecting to our cloud environments. But the existing tool is limited to AWS and cannot be implemented with the existing diagramming tool.

Reference is made to a prior art U.S. Ser. No. 10/635, 642B1 which discloses techniques for replicating data between different cloud computing platforms. Examples include storage replicator components operable in different cloud computing platforms. The first storage replicator component may identify the second cloud computing platform as a location to copy a data file in response to an event related to the data file stored in a first cloud computing platform. The first storage replicator component may request a copy of the data file via an application programming interface of the first cloud computing platform. The attributes of the copy of the data file which involve modification to conform to data management conventions of the second cloud computing platform may be determined and modified to comply with conventions of the second cloud computing platform. The modified copy of the data file may be forwarded to the second cloud computing platform for storage.

However, the existing software tool includes the drawbacks that are as follows:
- There's no software which connects the drawing tool with Cloud on the real time basis.
- Currently, the online diagramming tool consume components that may include servers, API gateway, functions etc., apart from storage or database.
- It only enables creation of network diagrams but cannot deploy cloud component(s). For e.g., a user cannot create a server/database/load balancer using the current tools/websites.
- The existing cloud based diagramming tool does not enable lift and shift the cloud option from one cloud platform to another.
- The existing cloud based diagramming tool does not enable connection of the existing/multiple diagramming tools with the cloud.
- Cloud has a "cloud functions" for example, AWS calls it as "AWS Lambda". They are serverless functions. One/more of the prior art entities can list out or show them in the diagram. They also show a database wherever present (as a separate entities). However, if a particular cloud function has used a database, then the link between the cloud function and the database is not shown.
- The prior art does not enable scheduling of back-up of the data.
- Monitoring of cloud components are not present.
- Cross cloud cost simulations and suggestion to the user to switch the cloud is not available. Since, the existing cloud based diagramming tool doesn't work across the cloud providers, doesn't prompt the user about saving of cost if user moves to another provider.

Therefore, in view of the above drawbacks, there exists a dire need for an improvement for implementation of a software application in the cloud computing system which allows interaction between the drawing tools with the various cloud service providers.

SUMMARY OF THE INVENTION

The following disclosure presents a simplified summary of the invention in order to provide a basic understanding of some aspects of the invention. This summary is not an extensive overview of the present invention. It is not intended to identify the key/critical elements of the invention or to delineate the scope of the invention. Its sole purpose is to present some concept of the invention in a simplified form as a prelude to a more detailed description of the invention presented later.

An objective of the present invention is to provide a solution that enables modelling of a cloud network using the add-on enabled drawing tools and that allows automatic deployment of the cloud components between various cloud platforms.

Another objective of the present invention to provide a software application that enables a cloud user to create a network diagram using a graphical drawing tool and a simple click makes the network diagram to be automatically deployed on the cloud and vice versa, enabling the cloud user to monitor their cloud components.

Accordingly, in one aspect, in one implementation, the present invention discloses a computer implemented method for implementation of a software application implemented by a processor, wherein said software application enables interoperability of one or more graphical drawing tool with one or more cloud computing platforms, wherein said method comprising:
  a user logging-in a user account of a first cloud computing platform linked with said one or more graphical drawing tool;
  configuring, within said one or more graphical drawing tool, at least a 2D or 3D network topology diagram by using one or more cloud components and its attributes imported from said first cloud computing platform;
  deploying, within said graphical drawing tool, said cloud components to generate a real-time cloud application network on said first cloud computing platform;
  copying, said cloud application network generated on said first cloud computing platform; and thereby
  migrating, said cloud application network from said first cloud computing platform to said second cloud computing platform for deploying said cloud component in a second cloud computing platform.

In second aspect, in one implementation, the present invention provides an application programming interface implemented by a processor of a digital device, wherein said application interface comprising:
  one or more graphical drawing tool to model a cloud application network using one or more cloud component imported from at least a first cloud computing platform, and thereby deploy said cloud component to generate a real-time network on said first cloud computing platform; Wherein said processor configured to:
    enable interoperability of said cloud components within said one or more graphical drawing tool with plurality of different cloud computing platforms;
    migrate said cloud application network from said first cloud computing platform to a second cloud computing platform for deploying said cloud components in said second cloud computing platform.

In third aspect, in one implementation, the present invention discloses a system for mapping one or more graphical drawing tool with one or more cloud computing platforms, wherein said system comprising:
  a cloud server application coupled to a plurality of cloud platforms, and each cloud platform comprising one or more cloud components;
  at least a digital device having a processor and a memory, wherein the digital device executing an application software for modelling a cloud network within a graphical drawing tool by importing said cloud components from a first cloud computing platform;
  wherein:
  each respective cloud computing platform from said plurality of cloud platforms is operable to perform functions via one or more respective application programming interfaces of each respective cloud platform;
  wherein, the application programming interface of the first cloud computing platform, allows interaction with said digital device to generate a cloud application network by deploying said cloud components from said first cloud computing platform; and
  thereby, migrate said cloud application network from said first cloud platform to a second cloud platform for deploying said cloud components in a second cloud platform.

Accordingly, based on the above disclosures, the present invention provides an application software which connects cloud systems with diagram making tools for instant creation of network diagrams. It further enables deployment of network diagrams to one or more cloud service providers. The user is able to shift the cloud component from one cloud platform to another cloud platform instantly. Further, the user is also able be transfer the network diagram from one diagram making tools to another.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

The above and other aspects, features and advantages of the embodiments of the present disclosure will be more apparent in the following description taken in conjunction with the accompanying drawings, in which:

FIG. 1: shows the block diagram architecture, according one implementation of the present invention.

Figure 2:
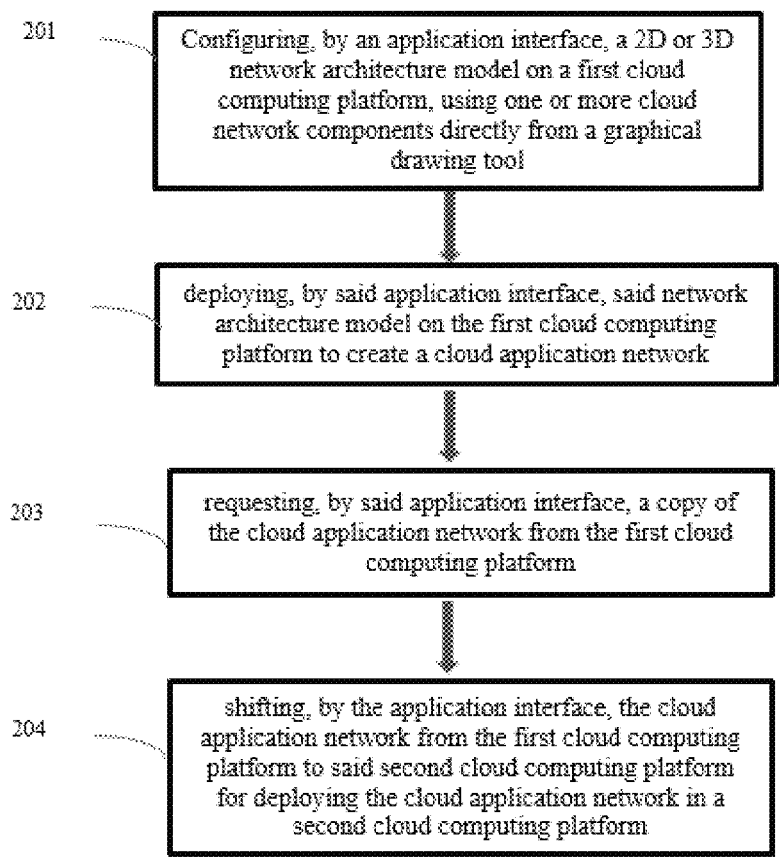

FIG. 2: shows a flowchart representation of the method for implementation of a software application, according to one exemplary implementation of the present invention.

Figure 3A:
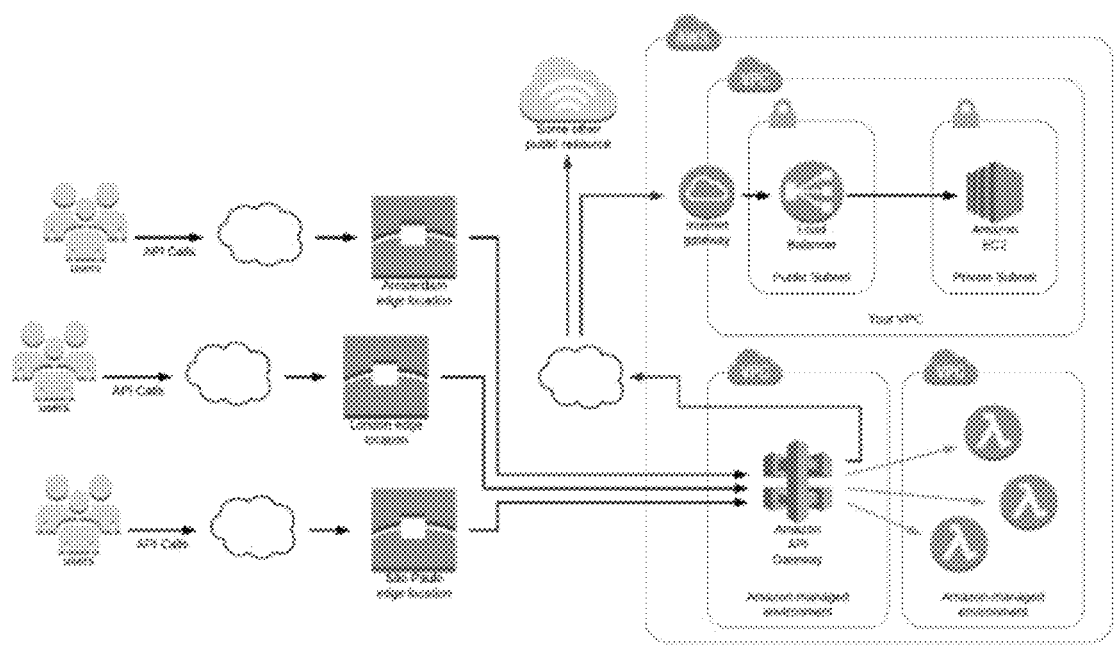

FIG. 3(a): shows a screenshot of certain icons/logs AWS uses for modelling the cloud network, according to one exemplary implementation of the present invention.

Figure 3B:
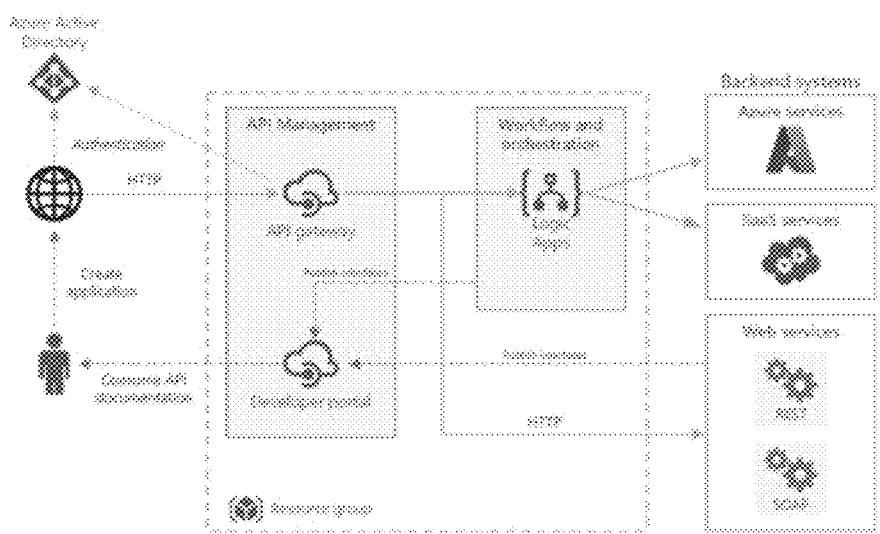

FIG. 3(b): shows a screenshot of certain icons/logs Azure uses for modelling the cloud network, according to second exemplary implementation of the present invention.

Figure 4A:
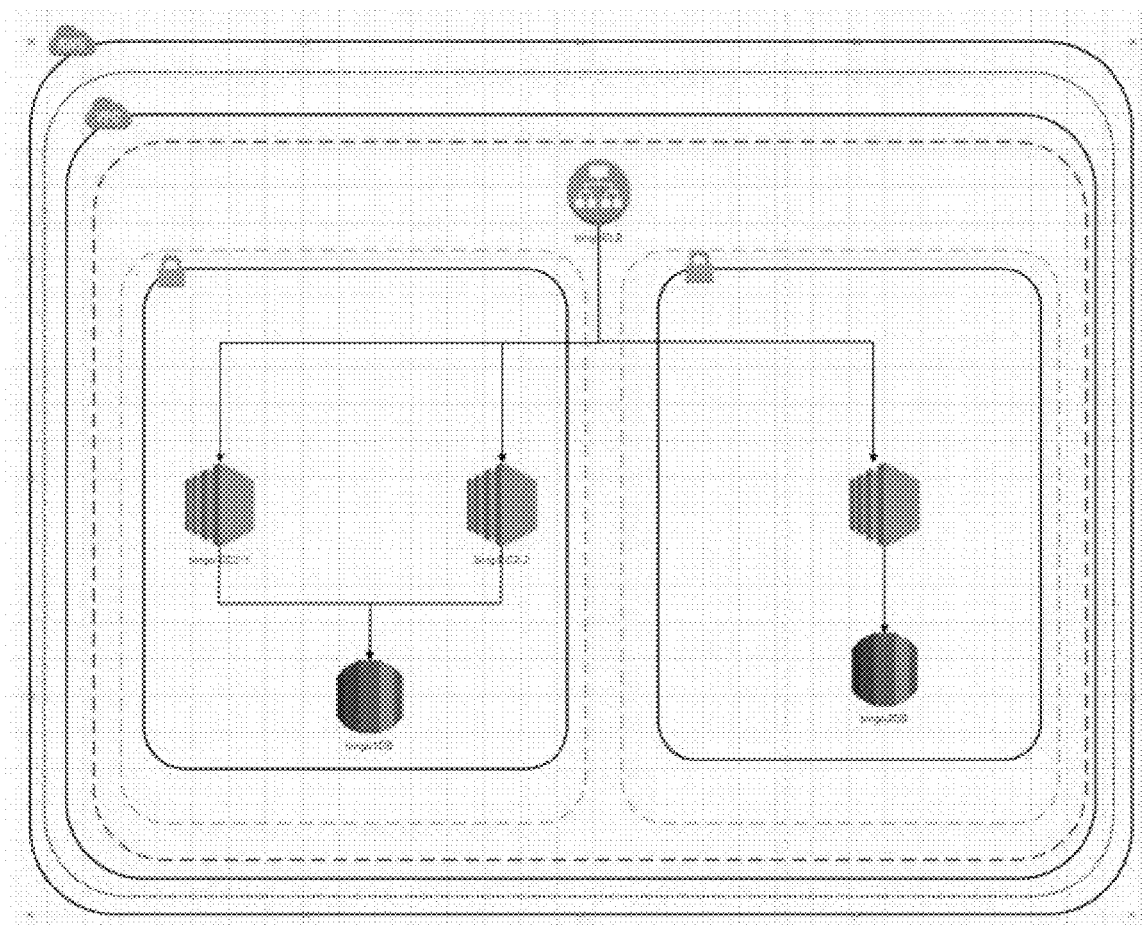

FIG. 4(a): shows the screenshot that the application network is executed in the cloud, according to one exemplary implementation of the present invention.

Figure 4B:
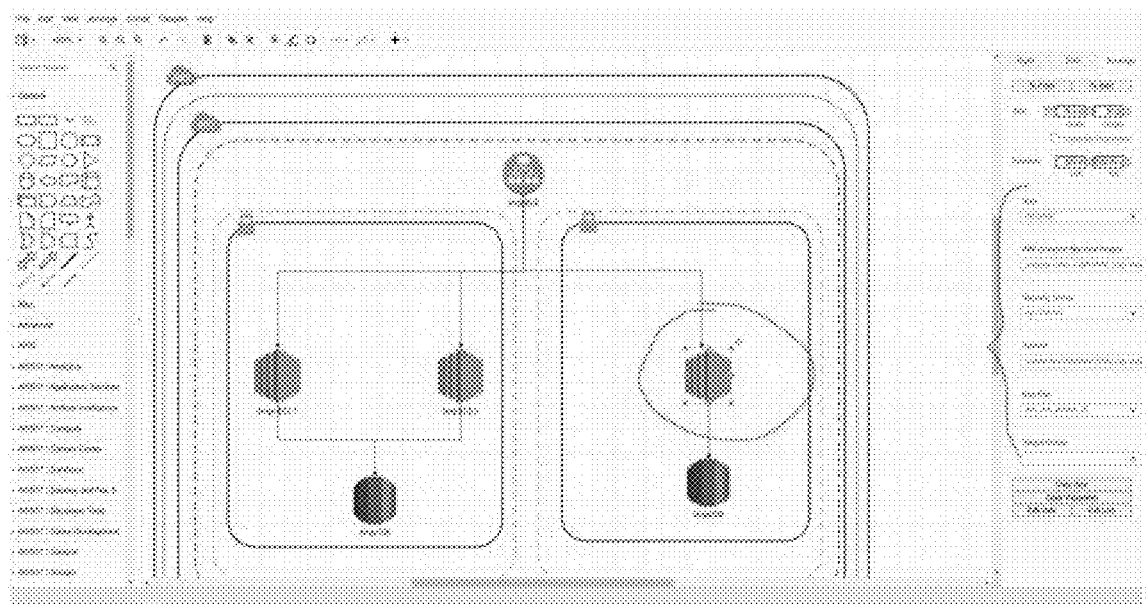

FIG. 4(b): shows the screenshot of the application interface that shows that the third virtual machine is selected, according to one exemplary implementation of the present invention Persons skilled in the art will appreciate that elements in the figures are illustrated for simplicity and clarity and may not have been drawn to scale. For example, the dimensions of some of the elements in the figure may be exaggerated relative to other elements to help to improve understanding of various exemplary embodiments of the present disclosure. Throughout the drawings, it should be noted that like reference numbers are used to depict the same or similar elements, features, and structures.

DETAILED DESCRIPTION OF THE PRESENT INVENTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, a reference to "a component surface" includes a reference to one or more of such surfaces.

All terms (including technical and scientific terms) used herein have the same meaning as commonly understood by one of ordinary skill in the art to which various embodiments belong. Further, the meaning of terms or words used in the specification and the claims should not be limited to the literal or commonly employed sense, but should be construed in accordance with the spirit of the disclosure to most properly describe the present disclosure.

The terminology used herein is for the purpose of describing particular various embodiments only and is not intended to be limiting of various embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. Also, Expressions such as "at least one of," when preceding a list of elements, modify the entire list of elements and do not modify the individual elements of the list.

The present disclosure relates to a software application tool that enables a real time interaction of an existing drawing tool with plurality of cloud platforms. The present invention uses a software program to add a specific add-on feature on the existing drawing making tools and the typical software program is implemented by any general-purpose computer.

In one implementation, the software program enables the user to create a network diagram based on a mouse click on the said specific add-on feature on the existing drawing making tools, and thereby said specific add-on feature interacts with the cloud server application to create a network diagram instantly.

In one implementation, the present invention can work in standalone mode (i.e. with its own diagramming tool) or can also work in conjunction with existing diagramming tools e.g. MS Visio, draw.io, gliphy or a customised drawing tool or any combinations thereof, depending on their ability to create add-ons to them or from the custom drawing tool.

In one exemplary implementation, to shift the cloud network from "first cloud platform" to the "second cloud platform", the software application may need to create some additional components in user's account. E.g. AWS S3 bucket to store some data temporarily.

In one exemplary implementation, the first and second cloud computing platform is selected from at least an Amazon AWS, IBM Cloud, Google Cloud Platform, Microsoft Azure or any combinations thereof.

In one implementation, the block diagram architecture is illustrated in the FIG. 1. As such, the system comprises a digital device connected to a cloud network. According to various embodiments, the digital device is one of, but not limited to, a mobile phone, a desktop computer, a laptop or a tablet etc. Similarly, according to various embodiments, the second digital device is one of, but not limited to, a mobile phone, a desktop computer, a laptop or a tablet etc. The digital device is able to communicate to the cloud network through many different methods depending on the device connectivity capabilities. These methods include but not limited to a cellular, satellite, Wi-Fi, Low Power Wide Area Networks (LPWAN) (e.g. NB-IoT), and direct connection to the Internet via Ethernet.

In one implementation, the flowchart representation of the software application is illustrated in the FIG. 2. The software application is implemented on a digital device having a graphical user interface. A user can use a combination of graphical user interface as well as a script. By the term "script", the users can write a JSON to create/modify a cloud component.

In one exemplary implementation, reference is made to FIG. 3. There are certain icons/logs AWS uses (sample below—FIG. 3(a)) and there are other icons with Azure uses (sample below—FIG. 3(b)). The system is followed universally. The software application will be able to convert one diagram form into another.

In one implementation reference is made to the FIGS. 4(a) & (b), the application network is executed in the cloud as shown in the FIG. 4(a). The user has a cloud account, e.g. AWS account. In one virtual private cloud (VPC) there are various cloud components. The gateway is from the load balancer, which is sending the traffic to three servers. The three servers are divided into two different subnets; one is public and the other is private. The first two application servers are connected to the database (via an application). And the third server is connected to another database with another application. The application servers are of different attributes (RAM, storage, CPUs; this is now shown in the above diagram). The security groups associated with the application servers can be the same or different. The user can configure any component within the diagramming tool. The screenshot below shows that the third virtual machine is selected as shown in the FIG. 4(b). The toolbar the right side instantly lists the component attributes such as operating system image, size of the machine, security group, but not limited to it. The user can either keep the defaults or change them before the deployment.

In one exemplary implementation, the user can deploy the entire network (components) to the linked cloud account. The following are the steps:
1. The diagram is read in terms of XML/JSON and the XML/JSON is sent to the cloud server.
2. Server parse the XML/JSON to create:
   a. The list of cloud components to act on.
   b. The precise action to be taken for each of the components. The "action" can be created, upscale, downscale, delete, move from one region to another etc.
   c. The software adds the relevant action which is technically necessary but not in the diagram. For example, to connect the ELB (elastic load balancer) with EC2, a target group needs to be created along with necessary rules for each target group is linked to EC2. So, the link is ELB-target group-EC2.
   d. After creating the list of required actions, software set the right sequence.
   e. Each item in the action list is executed. The individual results are recorded.
   f. The result is consolidated and sent back to the client application (diagramming tool/add-on).
3. The client receives the feedback (success/failure).
4. The software thus maps one to one diagramming elements to the actual cloud component (under the hood).
5. The software monitors the cloud elements for performance. The performance attributes may vary from component to component. For example, the performance attribute of an application server is different for the application server than the database server than the load balancer than the subnet.
6. The monitoring can be instantaneous or on-demand (depending on the user's preference).
7. Users can also set alerts on various events. For example, if the application server is down then the user will receive an email notification. The user can subscribe/unsubscribe to the events after logging into the software application. The software application can highlight/prompt the failed cloud component as well as send system alerts.

In second exemplary implementation, the user can open the software application (with empty canvas) and can use a single mouse click to import everything in the cloud account to be displayed as a landscape diagram. The following is the method steps:
   a. The software application connects to the user's cloud account.
   b. It lists all the components e.g. virtual machines, load balancers, subnets, security groups, database, cloud functions etc.
   c. It also reads the underlying attributes e.g. CPU, storage, RAM of virtual machines, allowed or blocked ports, allowed or blocked IP address for security groups and so on.
   d. The software application also figures out the connections between the various cloud components e.g. it links the subnets to virtual machines ("how many virtual machines are in a particular subnet ?"), it links the virtual machine to one or more security groups etc.
   e. The software application creates a diagram from these linked components.
   f. This diagram is then (automatically) drawn on the user's canvas.
   g. The user can then add one or more components or change any of the existing ones and click on "Deploy" button if they want to deploy it. The software application understands the change and deploys only the changed part. For example, the user imports the cloud components sees them in the form of a diagram, change a virtual machine's RAM from 8 GB to 16 GB and deploys back to the Cloud.
   h. The user can also enable/disables live monitoring of their network in the Cloud.

In third exemplary implementation, the user has a stable cloud network for eg. AWS for say 4 months. The monthly cost us US $ 2000. The software application analyses the cost (component by component), simulates it on other cloud platforms e.g. Azure. GCP, Digital Ocean etc. If it finds, the Azure cost is cheapest say US $ 1200 for the exact same network (i.e. same amount of servers, same RAM, same storage and so on) then it proactively suggests the movement from AWS to Azure indicating a detailed estimated price. If the user accepts the suggestion then in a few seconds the entire network is deployed to Azure and confirmation is given to the user. The deployment is covered in the first scenario (page 1 above). The software application may also be able to deploy the application from existing servers (AWS) to the new servers (Azure). This is not checked yet but we can use it in the claims.

In one exemplary implementation, a user can draw a network diagram (e.g. one application load balancer, 4 servers, one database), can set the specification (e.g. 16 GB RAM, 100 GB hard disk and so on), makes a mouse click and the network will be automatically created in his/her AWS account in just a few seconds. Moreover, the user can monitor the network in terms of availability, loading etc. The other way round is possible as well. That means, user has a network in AWS, he/she makes a mouse click and the network diagram is instantly created in one cloud platform for eg., MS Visio. And then, the user can monitor their network components.

In one exemplary implementation, according to the present invention, a user can draw a diagram using a graphical drawing tool, "deploy" and creates an AWS cloud network. The user may use the created cloud network for a while. Then copies and "PASTES" the network to a different cloud platform for eg. MS Azure. Then, the user may take out the network diagram which is compatible with a different drawing tool such as Gliffy etc. The user can also create another graphical diagram using a MS Visio diagram. Thus, by the implementation of the software application the user can do the following:

User X go to one graphical drawing tool and creates a network diagram for eg., AWS diagram, using one cloud computing platform i.e., AWS.

The user X "deploys" the AWS diagram. The software will provide an estimated cost for creating the network in AWS.

The user X copies (/replicates) or moves the cloud network diagram from one cloud platform to another for eg., from AWS to Azure.

The user X makes for eg., a Gliffy diagram from his/her network and uploads it on Gliffy.

In one exemplary implementation, reference is made to the FIG. 2, which the system architecture. The diagram takes MS Visio as an example. The software application may be add-on that sits on top of MS Visio. It can interact with the Server Application. User creates a diagram in MS Visio, clicks on the button. The said software application takes from there. It interacts with the server application by means of REST APIs. CSA does the following:
1. It "understands" the diagram.
2. Breaks it into various components
3. Put them into hierarchies
4. Create individual cloud components.
5. Provides the feedback to the software application.
6. The software application then prompts the user for successfully/failure operation.

Some of Noteworthy Features of the Present Invention are as Follows

1. Deployment of cloud components directly from the diagramming tool.
2. Moving the configured network/applications from one cloud provider to other.
3. Proactively suggesting economical/better components.
4. Real-time monitoring of the cloud components.

Some of the Non-Limiting Advantages of the Present Invention are as Follows

1. The present invention move the network from AWS to say Azure or vice versa.
2. The present invention enables "replication" of the network. E.g, if there are two servers which are connected to one database Now, user can just copy-paste the network to create a new one.
3. The present invention work across the cloud providers, prompting the user about saving of cost if user moves to another provider. Example: A user has a substantial amount of hardware components in AWS e.g. 10 servers, 3 databases etc. running for a few month with the monthly cost of $2,000. Let's say the same network cost on Azure is $1,500. And as mentioned above in point 2, they can just move their network to Azure.
4. The present invention can monitor the resources in a greater depth e.g. CPU utilisation, data in/out etc. The present invention does alert the user e.g. if CPU utilisation is exceeding 90% more than 3 times in an hour.
5. The present invention work with the existing drawing tools that may include MS Visio, draw.io, gliffy.com etc.
6. The present invention can import the diagram already made on the graphical drawing tool.
7. The software application can actually read inside the source code of cloud function and link the other cloud components used. E.g. API gateway↔cloud function↔database. None of the prior art entities does it.
8. User will be able to schedule the back-up of their data using the software application.
9. User will be able to take "image" of the application server and store as a data file on the storage system e.g. AWS S3. User will also be able to restore this image onto the virtual machine when required.

Thus, one embodiment of each of the computer implemented methods described herein is in the form of a computer-readable carrier medium carrying a set of instructions, e.g., a computer program that are for execution on one or more processors. Thus, as will be appreciated by those skilled in the art, embodiments of the present invention may be embodied as a method, an apparatus such as a special purpose apparatus, an apparatus such as a data processing system, or a computer-readable carrier medium. The computer-readable carrier medium carries computer readable code including a set of instructions that when executed on one or more processors cause a processor or processors to implement a method. Accordingly, aspects of the present invention may take the form of a method, an entirely hardware embodiment, an entirely software embodiment or an embodiment combining software and hardware aspects.

Those skilled in the art will recognize other use cases, improvements, and modifications to the embodiments of the present disclosure. All such improvements and other usecases are considered within the scope of the concepts disclosed herein.

We claim:

1. A computer implemented method for implementation of a software application implemented by a processor, wherein the software application enables interoperability of one or more graphical drawing tools with one or more cloud computing platforms, the method comprising:
a user logging-in a user account of a first cloud computing platform linked with the one or more graphical drawing tools;
configuring, within the one or more graphical drawing tools, at least a 2D or 3D network topology diagram by using one or more cloud components;
parsing the configured 2D or 3D network topology diagram to determine that there is at least one icon used by a first cloud computing platform to map the at least one icon to the one or more cloud components of the first cloud computing platform;
generating one of XML and JSON based on the parsing;
importing attributes of the configured 2D or 3D network topology diagram from the first cloud computing platform based on one of the XML and JSON;
deploying, within the graphical drawing tool, the cloud components to generate a real-time cloud application network using the first cloud computing platform;
copying, the cloud application network from the first cloud computing platform;
determining that one icon of the at least one icon in the 2D or 3D network topology diagram used by the first cloud computing platform is only used by the first cloud computing platform;
converting the cloud application network based on differences in a second cloud computing platform by mapping and converting the at least one icon to one or more cloud components of the second cloud computing platform; and
deploying the one or more cloud components in the second cloud computing platform, thereby migrating, the cloud application network from the first cloud computing platform to the second cloud computing platform.

2. The method as claimed in claim 1, wherein the graphical drawing tool is selected from at least a drawing tool that is capable of creating add-ons to the 2D or 3D network topology diagram.

3. The method as claimed in claim 1, wherein the software application enables dynamic listing and selection of the cloud components with their attributes corresponding to the first and second cloud computing platforms.

4. The method as claimed in claim 3, wherein the software application enables instantaneous and/or on-demand real-time monitoring of the cloud components and thereby syncing the 2D or 3D network topology diagram with the user account.

5. The method as claimed in claim 4, wherein the software application enables cost simulation of the cloud application network within the first cloud computing platform corresponding to the cloud application network in the second cloud computing platform.

6. The method as claimed in claim 1, further comprising simulating the cloud application network on the second cloud computing platform to determine that the cloud application network is cheaper on the second cloud computing platform than the first cloud computing platform.

7. An application programming interface implemented by a processor of a digital device, the application interface comprising:
one or more graphical drawing tools to model a cloud application network using one or more cloud components imported from at least a first cloud computing platform;
wherein the processor is configured to:
parse a 2D or 3D network topology diagram to determine that there is at least one icon used by a first cloud computing platform to map the at least one icon to the one or more cloud components of the first cloud computing platform;
generate one of XML and JSON based on the parsing;
deploy the one or more cloud components to generate a real-time network on the first cloud computing platform based on one of the XML and JSON;
enable interoperability of the cloud components within the one or more graphical drawing tools with a plurality of different cloud computing platforms, and:
determine that one icon of the at least one icon in the 2D or 3D network topology diagram used by the first cloud computing platform is only used by the first cloud computing platform;
convert the real-time network based on differences in a second cloud computing platform by mapping and converting the at least one icon to one or more cloud components of the second cloud computing platform; and
deploy the one or more cloud components in the second cloud computing platform, to thereby migrate the cloud application network from the first cloud computing platform to the second cloud computing platform.

8. A system for mapping one or more graphical drawing tools with one or more cloud computing platforms, the system comprising:
a cloud server application coupled to a plurality of cloud platforms, and each cloud platform comprising one or more cloud components;
at least a digital device having a processor and a memory, the digital device executing an application software for modelling a cloud network within a graphical drawing tool by importing the cloud components from a first cloud computing platform, the one or more cloud components imported by parsing a configured 2D or 3D network topology diagram to determine that there is at least one icon used by the first cloud computing platform to map the at least one icon to the one or more cloud components of the first cloud computing platform and generating one of XML and JSON based on the parsing;

wherein:
each respective cloud computing platform from the plurality of cloud platforms is operable to perform functions via one or more respective application programming interfaces of each respective cloud platform;
the application programming interface of the first cloud computing platform allows interaction with the digital device to generate a cloud application network by deploying the cloud components from the first cloud computing platform, and:
determine that one icon of the at least one icon in the 2D or 3D network topology diagram used by the first cloud computing platform is only used by the first cloud computing platform;
convert the cloud application network based on differences in a second cloud computing platform by mapping and converting the at least one icon to one or more cloud components of the second cloud computing platform; and
deploy the one or more cloud components in the second cloud computing platform, to thereby migrate the cloud application network from the first cloud platform to the second cloud platform.

9. A non-transitory computer-readable medium storing instructions that, when executed by a processor, enables interoperability of one or more graphical drawing tools with one or more cloud computing platforms and cause the processor to perform operations comprising:
logging-in a user account of a first cloud computing platform linked with the one or more graphical drawing tools;
configuring, within the one or more graphical drawing tools, at least a 2D or 3D network topology diagram by using one or more cloud components;
parsing the configured 2D or 3D network topology diagram to determine that there is at least one icon used by a first cloud computing platform to map the at least one icon to the one or more cloud components of the first cloud computing platform;
generating one of XML and JSON based on the parsing; and
importing attributes of the configured 2D or 3D network topology diagram from the first cloud computing platform based on one of the XML and JSON;
deploying, within the graphical drawing tool, the cloud components to generate a real-time cloud application network using the first cloud computing platform;
copying, the cloud application network from the first cloud computing platform;
determining that one icon of the at least one icon in the 2D or 3D network topology diagram used by the first cloud computing platform is only used by the first cloud computing platform;
converting the cloud application network based on differences in a second cloud computing platform by mapping and converting the at least one icon to one or more cloud components of the second cloud computing platform; and
deploying the one or more cloud components in the second cloud computing platform, thereby migrating the cloud application network from the first cloud computing platform to the second cloud computing platform.

* * * * *